(12) United States Patent  
Chang et al.

(10) Patent No.: US 9,036,561 B2  
(45) Date of Patent: May 19, 2015

(54) DUAL-HOMING PROTECTION

(75) Inventors: Xiangqing Chang, Beijing (CN); Jianfeng Liu, Beijing (CN); Min Yao, Beijing (CN); Zhonghua Gao, Beijing (CN); Liyao Zhao, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/348,555

(22) PCT Filed: Sep. 6, 2012

(86) PCT No.: PCT/CN2012/081046  
§ 371 (c)(1),  
(2), (4) Date: Mar. 28, 2014

(87) PCT Pub. No.: WO2013/097483  
PCT Pub. Date: Jul. 4, 2013

(65) Prior Publication Data  
US 2014/0301275 A1 Oct. 9, 2014

(30) Foreign Application Priority Data  
Dec. 29, 2011 (CN) .......................... 2011 1 0455455

(51) Int. Cl.  
*H04W 4/00* (2009.01)  
*H04W 60/00* (2009.01)  
*H04L 12/24* (2006.01)  
*H04L 12/721* (2013.01)  
*H04L 12/707* (2013.01)  
(Continued)

(52) U.S. Cl.  
CPC ......... *H04W 60/005* (2013.01); *H04L 41/0846* (2013.01); *H04L 45/68* (2013.01); *H04L 45/22* (2013.01); *H04L 45/28* (2013.01); *H04L 45/50* (2013.01)

(58) Field of Classification Search  
None  
See application file for complete search history.

(56) References Cited

U.S. PATENT DOCUMENTS

| | | | | |
|---|---|---|---|---|
| 2007/0008982 | A1* | 1/2007 | Voit et al. ...................... | 370/401 |
| 2007/0280102 | A1* | 12/2007 | Vasseur et al. ................ | 370/225 |
| 2009/0274155 | A1* | 11/2009 | Nakash .................... | 370/395.53 |

(Continued)

FOREIGN PATENT DOCUMENTS

| | | |
|---|---|---|
| CN | 1984076 | 6/2007 |
| CN | 101340351 | 1/2009 |

(Continued)

OTHER PUBLICATIONS

International Search Report and Written Opinion dated Dec. 13, 2012 issued on PCT Patent Application No. PCT/CN2012/081046 dated Sep. 6, 2012, The State Intellectual Property office, the P.R. China.

*Primary Examiner* — Otis L Thompson, Jr.  
(74) *Attorney, Agent, or Firm* — Mannava & Kang, P.C.

(57) ABSTRACT

Examples of the present disclosure provide a dual-homing protection method and device. In the dual-homing protection method, a forwarding item synchronizing channel and a data transfer channel are established between two Provider Edge (PE) devices in a dual-homing node, a Pseudo Wire (PW) and a Label Switched Path (LSP) protection group bearing the PW are established between a network side peer PE device and the two PE devices in the dual-homing node, which are taken as a logical device, so as to implement LSP protection within a network. The present disclosure may enable the protection within a network to be independent of access link protection. Subsequently, the management is simple.

15 Claims, 6 Drawing Sheets

(51) Int. Cl.
*H04L 12/703* (2013.01)
*H04L 12/723* (2013.01)

(56) References Cited

U.S. PATENT DOCUMENTS

| | | | |
|---|---|---|---|
| 2010/0202297 A1* | 8/2010 | Liu et al. | 370/242 |
| 2010/0208593 A1* | 8/2010 | Soon et al. | 370/242 |
| 2010/0208615 A1* | 8/2010 | Soon et al. | 370/254 |
| 2011/0032945 A1* | 2/2011 | Mullooly et al. | 370/401 |
| 2012/0106360 A1* | 5/2012 | Sajassi et al. | 370/245 |
| 2012/0147740 A1* | 6/2012 | Nakash | 370/221 |
| 2012/0170449 A1* | 7/2012 | Nakash | 370/225 |
| 2012/0236730 A1* | 9/2012 | Zhou et al. | 370/244 |
| 2013/0148657 A1* | 6/2013 | Salam et al. | 370/390 |
| 2013/0266008 A1* | 10/2013 | Xue et al. | 370/389 |
| 2014/0010112 A1* | 1/2014 | Soon et al. | 370/254 |

FOREIGN PATENT DOCUMENTS

| | | |
|---|---|---|
| CN | 101582834 | 11/2009 |
| CN | 101626335 | 1/2010 |
| CN | 101826983 | 9/2010 |
| CN | 101902353 | 12/2010 |
| CN | 102571426 | 7/2012 |
| WO | WO2011/088686 | 7/2011 |

\* cited by examiner

US 9,036,561 B2

DUAL-HOMING PROTECTION

CLAIM FOR PRIORITY

The present application is a national stage filing under 35 U.S.C 371 of PCT application number PCT/CN2012/081046, having an international filing date of Sep. 6, 2012, which claims priority to Chinese patent application number 201110455455.9, filed on Dec. 29, 2011, the disclosures of which are hereby incorporated by reference in their entireties.

BACKGROUND

Two Provider Edges (PEs, dual-homing node) connect to the same Custom Edge (CE) via respective access links to implement protection for an access service at PE nodes of both ends of a bearer network, which is referred to as dual-homing protection.

BRIEF DESCRIPTION OF THE DRAWINGS

Features of the present disclosure are illustrated by way of example and not limited in the following figure(s), in which like numerals indicate like elements, in which.

DETAILED DESCRIPTION

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples. As used herein, the term "includes" means includes but not limited to, the term "including" means including but not limited to. The term "based on" means based at least in part on.

The present disclosure relates to communication technologies, and more particularly, to a dual-homing protection method and device.

Applications pertaining to dual-homing protection is described in the following, with an example of a mobile backhaul transport network.

Figure 1:
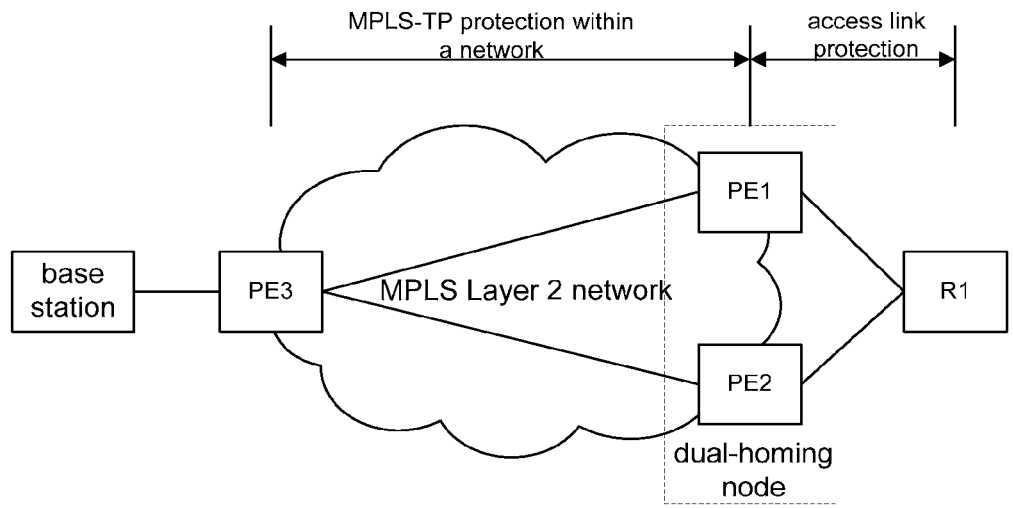
FIG. 1 is a diagram of an illustrative mobile backhaul transport network, according to an example of the present disclosure.

With reference to FIG. 1, FIG. 1 is a diagram of an illustrative mobile backhaul transport network, according to an example of the present disclosure. As shown therein, the base station may access PE3 with an access link, and then access core PE devices: PE1, PE2, via a Multi-protocol Label Switching (MPLS) Layer 2 network, and finally access a Base Station Controller (BSC) R1. PE1 and PE2 are deployed as a dual-homing node for R1, so as to provide dual-homing protection for services between base station access device PE3 and BSC R1.

As shown in FIG. 1, the dual-homing protection may be formed by two sections. The first section is MPLS-Transport Profile (MPLS-TP) protection within a network from PE3 to PE1 or PE2. The second section is access link protection from PE1 or PE2 to R1. Implementation of the dual-homing protection mechanism relies on collaboration of the MPLS-TP protection within a network and access link protection.

Figure 3:
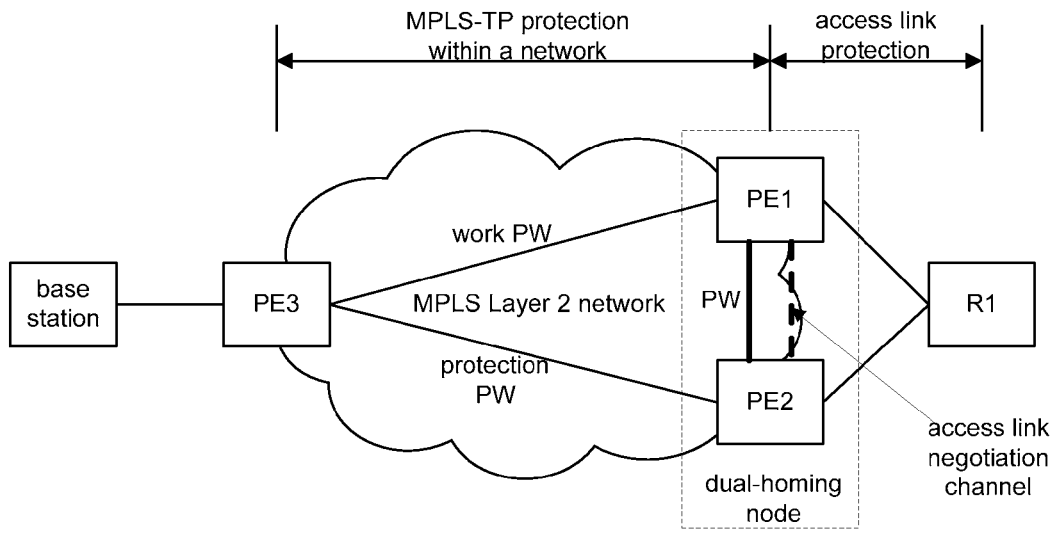
FIG. 3 is a flowchart of a second method for implementing dual-homing protection based on FIG. 1, according to an example of the present disclosure.

Since 1:1 or 1+1 protection of Label Switched Path (LSP) defined by the MPLS-TP may only support protection with the same source node and the same destination node, while the dual-homing node as a destination node includes two devices. Subsequently, the MPLS-TP protection within a network may generally be implemented by establishing a Pseudo Wire (PW) protection group (for instance, as shown in FIG. 3), which includes two protection modes of selecting to receive one data stream at the receiver from two data streams sent by the sender (1+1) and receiving one data stream at the receiver from one data stream sent by the sender (1:1). Access link protection may employ different protection modes, according to different access links. When the access link is an Ethernet link, Link Aggregation Group (LAG) technologies may be employed, so as to implement access link protection by establishing an LAG protection group, which includes two protection modes of LAG load sharing protection and LAG primary-standby protection. When the access link is a Synchronous Digital Hierarchy (SDH) link, Linear Multiplex Section Protection (LMSP) protection may be employed, so as to implement access link protection by establishing an LMSP protection group, which includes LMSP 1+1 protection and LMSP 1:1 protection.

Figure 2:
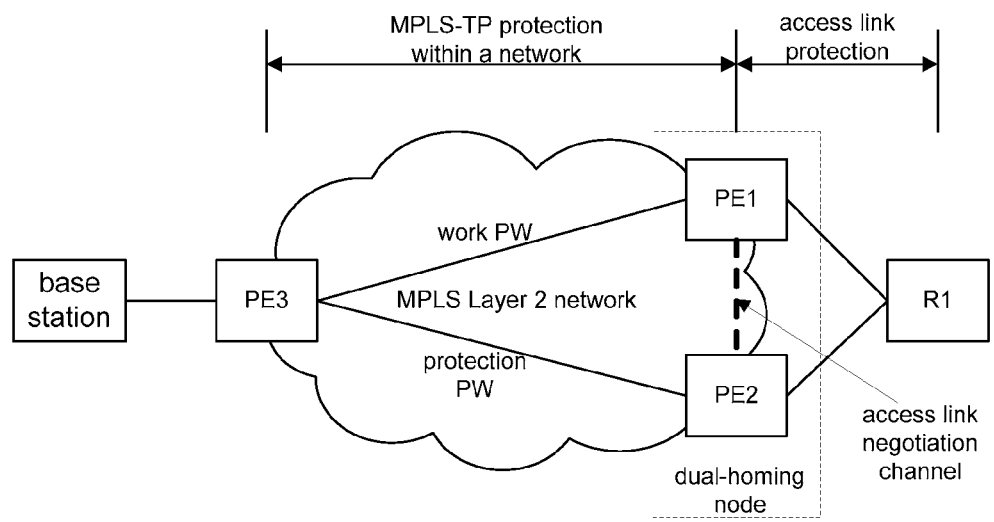
FIG. 2 is a flowchart of a first method for implementing dual-homing protection based on FIG. 1, according to an example of the present disclosure.
Figure 4:
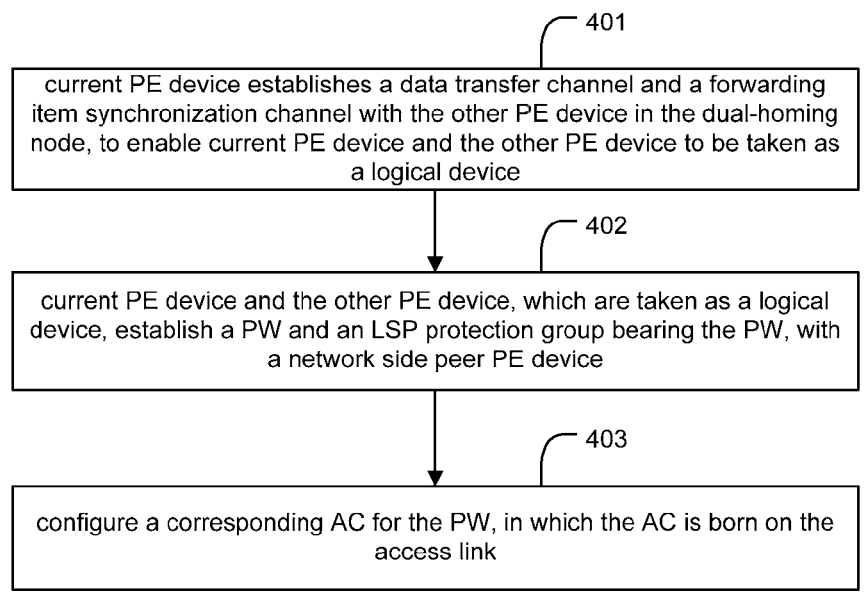
FIG. 4 is a flowchart of an illustrative dual-homing protection method, according to an example of the present disclosure.

With reference to FIG. 4, FIG. 4 is a flowchart of an illustrative dual-homing protection method, according to an example of the present disclosure. The method may be applied to either PE device of the two PE devices in a dual-homing node. In the description of the method in FIG. 4, it is assumed that a cross-device access link negotiation channel has already been established between the two PE devices and that a cross-device access link protection has also been configured for the access link of the dual-homing node, for instance, as shown in FIG. 2. The method includes the following blocks.

Block 401, the current PE device establishes a data transfer channel and a forwarding item synchronization channel with the other PE device in a dual-homing node, so as to enable the current PE device and the other PE device to be taken as a logical device.

In addition, the current PE device, acting as one PE device in the dual-homing node, establishes the forwarding item synchronization channel with the other PE device in the dual-homing node, so as to synchronize the forwarding item between the current PE device and the other PE device. Subsequently, for a network side peer PE device, the current PE device and the other PE device may be taken as a logical device on a control plane.

Since the cross-device access link negotiation channel has already been established between the current PE device and the other PE device, the access link protection has also been configured for access links of the current PE device and the other PE device (that is, access link of the dual-homing node). Subsequently, for a CE device at the access link side, the current PE device and the other PE device may also be taken as a logical device.

In addition, a data transfer channel is also established at a Layer 2 interface layer between the current PE device and the other PE device. Thus, the cross-device Layer 2 data transfer may be implemented between the two PE devices via the data transfer channel, and any Layer 3 data may be transferred thereon. That is, both the access link side packet and the transport network side packet may be transferred between the current PE device and the other PE device.

Thus, for a remote PE device of the network side and a CE device of access link side, the two PE devices in the dual-homing node may logically be considered as one device, so as to enable the transmission of any Layer 3 packet between the two PE devices. Subsequently, protection within a network and access link protection may be independent of each other. The access link protection mode may no longer affect the protection mode within a network.

Block 402, the current PE device and the other PE device, which are taken as a logical device, establish a PW and an LSP protection group bearing the PW with a network side peer PE device.

Here, based on the characteristics of the LSP protection group, that is, same source node and same destination node, after being taken as a logical device on the control plane, the current PE device and the other PE device may establish a PW and an LSP protection group bearing the PW with a network side peer PE device, so as to implement LSP protection between the peer PE device and the dual-homing mode. Thus, LSP protection within a network may be implemented. When a work LSP is established between the current PE device and the peer PE device, a protection LSP is established between the other PE device and the peer PE device. When a protection LSP is established between the current PE device and the peer PE device, a work LSP is established between the other PE device and the peer PE device. An LSP protection group may be formed by the work LSP and the protection LSP.

In addition, the LSP protection within a network may be implemented by establishing an LSP protection group between the dual-homing node and the network side peer PE device. A higher level PW protection is no longer necessary. Moreover, cross-device control negotiation is also not needed for the PW protection. Thus, the LSP protection within a network is independent of access link protection. Since LSP is a bearer channel of PW, one LSP may bear multiple PWs, which may share the data transfer channel between the two PE devices in the dual-homing node. Subsequently, the link switch may be more effective and management thereof may be simpler.

Block 403, a corresponding Access Circuit (AC) is configured for the PW, in which the AC is born on the access link.

In a Layer 2 Virtual Private Network (L2VPN), for a same service, a one-to-one correspondence relationship may be configured for AC and PW, as may conventionally be known.

This example is implemented in a Layer 2 network. Thus, after the current PE device and the other PE device, which are taken as a logical device, establish a PW and an LSP protection group bearing the PW with a network side peer PE device, it is also necessary to configure an AC of an access link for a bearer corresponding to the PW. Subsequently, after receiving a packet from the PW, either PE device in the dual-homing node may send the packet from an AC corresponding to the PW. Similarly, after receiving a packet from the AC, the packet may be sent via the PW corresponding to the AC. Here, after the access link protection is configured for an access link of the dual-homing node, that is, the access link via which the two PE devices in the dual-homing node may access the same CE (actual physical link), the two access links may logically form one aggregate link, and various ACs may be born thereon. Each AC therein corresponds to a combination of a fixed Virtual Local Area Network (VLAN) and a port.

In practical applications, a primary device may be selected from the current PE device and the other PE device, and the remaining one may be taken as a standby device. Subsequently, the primary device is in charge of controlling synchronization of forwarding items associated with the LSP protection group with the standby device by using the forwarding item synchronization channel. When the work LSP and the protection LSP in the LSP protection group are normal, a packet may be transmitted via the work LSP. When the work LSP in the LSP protection group is broken down, a packet may be transmitted via the protection LSP.

Thus, the example illustrated in FIG. 4 may further include the following.

When the current PE device is taken as the primary device, the work LSP in the LSP protection group is normal, the local forwarding item associated with the LSP protection group is configured to be associated with the work LSP in the LSP protection group, and the forwarding item is synchronized with the standby device via the forwarding item synchronization channel, in which the forwarding item is associated with the LSP protection group. When the work LSP in the LSP protection group is detected to be broken down, the local forwarding item associated with the LSP protection group is modified to be associated with the protection LSP in the LSP protection group, and the modified forwarding item is synchronized with the standby device via the forwarding item synchronization channel, in which the modified forwarding item is associated with the LSP protection group.

Here, the forwarding item associated with the LSP protection group refers to a forwarding item, which is pointed to by an item index of the LSP protection group. When the work LSP in the LSP protection group is normal, contents of the forwarding item are related with the work LSP in the LSP protection group. Thus, the method for configuring the local forwarding item associated with the LSP protection group, to enable it to be associated with the work LSP in the LSP protection group may be as follows. Configure an out label in the forwarding item to be the out label of the dual-homing node on the work LSP. Configure an out port in the forwarding item to be the out port of the dual-homing node on the work LSP. When the work LSP in the LSP protection group is detected as being broken down, contents in the forwarding item are related with the protection LSP in the LSP protection group. Thus, the method for modifying the local forwarding item associated with the LSP protection group, to enable it to be associated with the protection LSP in the LSP protection group, may be as follows. Modify the out label in the forwarding item to be the out label of the dual-homing node on the protection LSP. Modify the out port in the forwarding item to be the out port of the dual-homing node on the protection LSP.

In addition, the current PE device and the other PE device, which are taken as a logical device, are to synchronize the forwarding item. When configuring the local forwarding item associated with the LSP protection group to be associated with the work LSP in the LSP protection group, the current PE device is to synchronize the forwarding item with the standby device via the forwarding item synchronization channel. When configuring the local forwarding item associated with the LSP protection group to be associated with the protection LSP in the LSP protection group, the current PE device still is to synchronize the forwarding item with the standby device via the forwarding item synchronization channel. Correspondingly, when the current PE device is taken as the standby device, when receiving the forwarding item associated with the LSP protection group synchronized by the primary device, the current PE device is to cover the local forwarding item associated with the LSP protection group, by employing the forwarding item associated with the LSP protection group synchronized by the primary device, so as to enable the forwarding item of the current PE device to be consistent with that of the primary device.

In the example illustrated in FIG. 4, when receiving a packet from the AC, the current PE device may determine a PW corresponding to the AC as well as the LSP protection group bearing the PW, according to configurations in block 403, and then forward the packet, according to the PW corresponding to the AC and a forwarding item associated with the LSP protection group bearing the PW.

Here, when receiving a packet from the AC, the current PE device is to determine the PW corresponding to the AC, the LSP protection group bearing the PW, and determine the out port of the packet according to the forwarding item associated with the LSP protection group. Additionally, based on different fault conditions of the work LSP in the LSP protection group, the out port may be an out port of the dual-homing node on the work LSP in the LSP protection group. Alternatively, the out port may be an out port of the dual-homing node on the protection LSP in the LSP protection group. On the other hand, the work LSP may be the work LSP in the LSP protection group or the protection LSP in the LSP protection group, which is established between the current PE device and the network side peer PE device. Thus, the out port of a packet received by the current PE device from the AC may be a local port, or may be a port of the other PE device. When the out port of the packet received by the current PE device from the AC is the local port, the packet may be directly forwarded from the local port. When the out port of the packet received by the current PE device from the AC is a port of the other PE device, the current PE device is to send the packet to the other PE device via the data transfer channel so as to enable the other PE device to send the packet from the out port of the packet.

In addition, when sending the packet received from the AC to the network side, the current PE device is to perform PW encapsulation and LSP encapsulation on the packet. Thus, when the packet is to be sent to the other PE device via the data transfer channel, to enable the other PE device to send out the packet from the out port of the packet, the PW encapsulation and the LSP encapsulation may first be executed for the packet. And then, the packet may be sent to the other PE device. The other PE device is in charge of forwarding the packet from the out port of the packet. Alternatively, the packet may first be sent to the other PE device. And then, the other PE device is in charge of performing the PW encapsulation and the LSP encapsulation on the packet, and forwarding the packet from the out port of the packet.

When the packet is first encapsulated and then sent to the other PE device to be forwarded, the method for forwarding the packet according to the PW corresponding to the AC and the forwarding item associated with the LSP protection group bearing the PW includes the following. Respectively take the out label of the PW corresponding to the AC and the out label in the forwarding item associated with the LSP protection group bearing the PW as an inner label and an outer label of the packet. Encapsulate the inner label and outer label of the packet into the packet. Determine the out port of the packet, according to the forwarding item associated with the LSP protection group bearing the PW. When the out port of the packet is a local port, send out the packet from the out port. When the out port of the packet is a port of the other PE device, send the packet and out port information of the packet to the other PE device via the data transfer channel, so as to enable the other PE device to send out the packet from the out port.

Correspondingly, when receiving the packet and out port information of the packet from the other PE device via the data transfer channel, the current PE device may send out the packet from the out port, according to the out port information of the packet.

When the packet is first sent to the other PE device, and the other PE device is in charge of encapsulating and forwarding the packet, the method for forwarding the packet, according to the PW corresponding to the AC and the forwarding item associated with the LSP protection group bearing the PW, includes the following. Determine an out port of the packet, according to the forwarding item associated with the LSP protection group, which bears the PW corresponding to the AC. When the out port of the packet is a local port, respectively take the out label of the PW corresponding to the AC and the out label in the forwarding item associated with the LSP protection group bearing the PW as an inner label and an outer label of the packet, encapsulate the inner label and outer label of the packet into the packet, and send out the packet from the out port. When the out port of the packet is a port of the other PE device, send the packet and the AC information to the other PE device via the data transfer channel, so as to enable the other PE device to send out the packet from the out port of the other PE device, according to the AC information.

Correspondingly, when receiving the packet and the AC information sent by the other PE device via the data transfer channel, the current PE device may determine the PW corresponding to the AC and the LSP protection group bearing the PW, respectively take the out label of the PW corresponding to the AC and the out label in the forwarding item associated with the LSP protection group bearing the PW as the inner label and outer label of the packet, encapsulate the inner label and outer label of the packet into the packet, determine the out port of the packet, according to the forwarding item associated with the LSP protection group bearing the PW, and send out the packet from the out port.

In the example illustrated in FIG. 4, after receiving the packet from the PW, the current PE device may determine the AC corresponding to the PW, according to the configurations in block 403, and then forward the packet according to configured cross-device access link protection and state of the access link bearing the AC, which is negotiated with the other PE device via the access link negotiation channel.

Here, different access link protections may be configured according to different access links. Specifically, when the access link is an SDH link, the cross-device access link protection configured for the access link may be the LMSP protection, which includes LMSP 1+1 protection and the LMSP 1:1 protection. When the access link is an Ethernet link, the cross-device access link protection configured for the access link may be LAG protection, which includes LAG primary-standby protection and LAG load sharing protection.

In addition, after configuring the access link protection for the access link, the two PE devices in the dual-homing node may report respective access link states and execute access link switch negotiation, via the cross-device access link negotiation channel. Descriptions about processes after the current PE device receives a packet from the PW and a packet from the AC are respectively provided in the following for different combinations of access link state and cross-device access link protection configured for the access link.

First, when the access link is an SDH link, and the cross-device access link protection configured for the access link is the LMSP 1+1 protection.

Under these circumstances, when respective access links of the two PE devices in the dual-homing node are normal, the two PE devices will receive the AC packet from respective access links. Thus, it is necessary to aggregate the AC packet, which is received by the two PE devices via respective access links, to one PE device thereof. And then, select to receive the AC packet from the work link. The packet may be aggregated to the PE device connected with the work link, or to the PE device, which is taken as the primary device.

Thus, after receiving the AC packet, but before determining the PW corresponding to the AC and the LSP protection group bearing the PW, the method may further include the following. When the access link of the current PE device is the protection link, the packet is sent to the other PE device via the data transfer channel; otherwise, the PW corresponding to the AC and the LSP protection group bearing the PW is determined.

Correspondingly, when the access link of the current PE device is the work link and the work link is normal, the packet is selected to be received from the work link. When the work link is broken down, the packet is selected to be received from the protection link, which is sent by the other PE device via the data transfer channel. When the access link of the current PE device is the protection link and the work link is normal, the packet is selected to be received from the work link, which is sent by the other PE device via the data transfer channel; when the work link is broken down, the packet is selected to be received from the protection link.

Alternatively, after receiving the packet from the AC, before determining the PW corresponding to the AC and the LSP protection group bearing the PW, the method further includes the following. When the current PE device is taken as the standby device, the packet is sent to the other PE device via the data transfer channel; otherwise, the PW corresponding to the AC and the LSP protection group bearing the PW is determined.

Correspondingly, when the current PE device is taken as the primary device, the access link of the current PE device is the work link, and the work link is normal, the packet is selected to be received from the work link. When the access link of the current PE device is the work link, which is broken down, the packet is selected to be received from the protection link, which is sent by the other PE device via the data transfer channel. When the access link of the current PE device is the protection link, and the work link is normal, the packet is selected to be received from the work link, which is sent by the other PE device via the data transfer channel. When the access link of the current PE device is the protection link, and the work link is broken down, the packet is selected to be received from the protection link.

A packet from the PW is to be simultaneously sent with the work link and the protection link.

Thus, the method for forwarding the PW packet, according to the configured cross-device access link protection and state of access link bearing the AC, which is negotiated with the other PE device via the access link negotiation channel, may include the following. The current PE device may forward the packet via the access link of the current PE device, and send the packet to the other PE device via the data transfer channel to enable the other PE device to forward the packet via the access link of the other PE device.

Correspondingly, when receiving the PW packet sent by the other PE device via the data transfer channel, the current PE device may forward the packet via the access link of the current PE device.

Second, when the access link is an Ethernet link, the cross-device access link protection configured for the access link is the LAG load sharing protection.

Under these circumstances, a packet from the AC may be encapsulated and forwarded locally according to the out port of the packet. Or, the packet may be encapsulated and sent to the other PE device to be forwarded. As another alternative, the packet may be directly sent to the other PE device, and then, the other PE device may encapsulate and forward the packet.

A packet from the PW may be forwarded locally according to a load sharing method. Or, the packet may be sent to the other PE device to be forwarded.

Thus, the method for forwarding the PW packet, according to the configured cross-device access link protection and state of the access link bearing the AC, which is negotiated with the other PE device via the access link negotiation channel, may be as follows. When respective access links of the current PE device and the other PE device are normal, the access link for sending the packet is determined. When the determined access link is the access link of the current PE device, the packet is forwarded via the access link of the current PE device. When the determined access link is the access link of the other PE device, the packet is sent to the other PE device via the data transfer channel, to enable the other PE device to forward the packet via the access link of the other PE device.

Correspondingly, when the current PE device receives the PW packet sent by the other PE device via the data transfer channel, the current PE device forwards the packet via the access link of the current PE device.

In a third example, the access link is an SDH link, and the cross-device access link protection configured for the access link is the LMSP 1:1 protection; or, the access link is an Ethernet link, and the cross-device access link protection configured for the access link is the LAG primary-standby protection.

In these two cases, a packet from AC side may be encapsulated and forwarded locally according to the out port of the packet. Or, the packet may be encapsulated and then sent to the other PE device to be forwarded. As a further alternative, the packet may be directly sent to the other PE device, and then the other PE device encapsulates and forwards the packet.

A packet from the PW may determine to forward the packet locally or to send the packet to the other PE device to be forwarded, according to the breakdown state of the work link.

Specifically, the method for forwarding the PW packet, according to the configured cross-device access link protection and state of the access link bearing the AC, which is negotiated with the other PE device via the access link negotiation channel, may include the following. When the access link of the current PE device is the work link, and the work link is normal, the packet is forwarded via the work link. When the work link is broken down, the packet is sent to the other PE device via the data transfer channel to enable the other PE device to forward the packet via the protection link.

When the access link of the current PE device is the protection link, and the work link is normal, the packet is sent to the other PE device via the data transfer channel to enable the other PE device to forward the packet via the work link. When the work link is broken down, the packet is forwarded via the protection link.

Correspondingly, when the current PE device receives the packet from the PW, which is sent by the other PE device via the data transfer channel, the current PE device may forward the packet via the access link of the current PE device.

In the example illustrated in FIG. 4, when recovery of the work LSP in the LSP protection group is detected, the current PE device, which is taken as the primary device, may select to transmit packets via the work LSP once again. Alternatively, the current PE device may also select to continuously transmit packets via the protection LSP. When the protection LSP is broken down, the current PE device may send an instruction to transmit packets via the work LSP once again. When selecting to transmit packets via the work LSP once again, the local forwarding item associated with the LSP protection group may be modified to enable the local forwarding item to be associated with the work LSP in the LSP protection group. And then, the standby device may be informed, i.e., synchronized, about the modified forwarding item associated with the LSP protection group via the forwarding item synchronization channel. The method for modifying the local forwarding item associated with the LSP protection group to enable local forwarding item to be associated with the work LSP in the LSP protection group may be as follows. Modify an out label in the forwarding item to be an out label of the dual-homing node on the work LSP and modify an out port in the forwarding item to be an out port of the dual-homing node on the work LSP.

Figure 5:
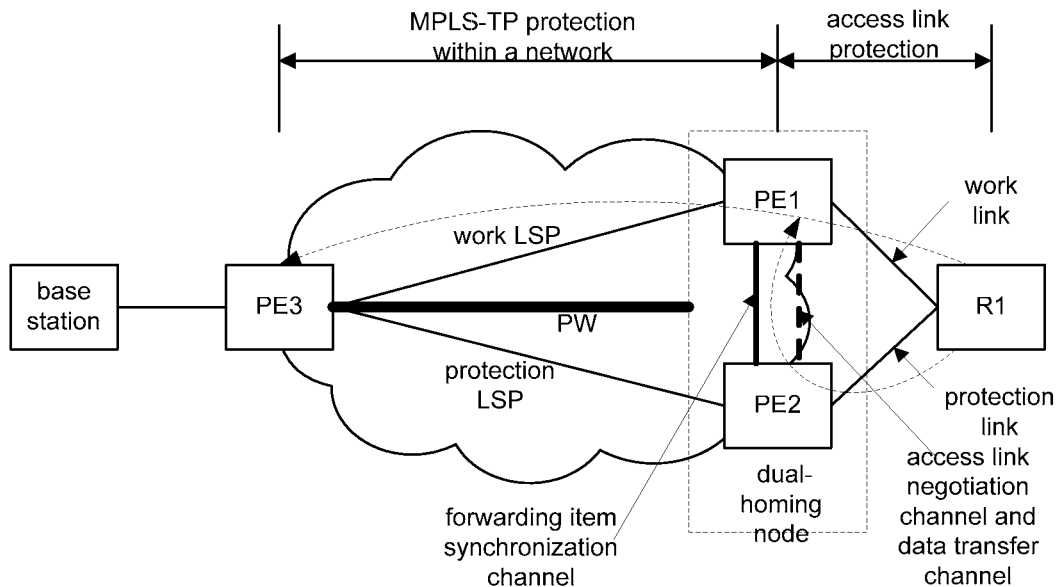
FIG. 5 is a diagram of an illustrative packet forwarding path, when work Label Switch Path (LSP) and work link are normal, according to an example of the present disclosure.
Figure 6:
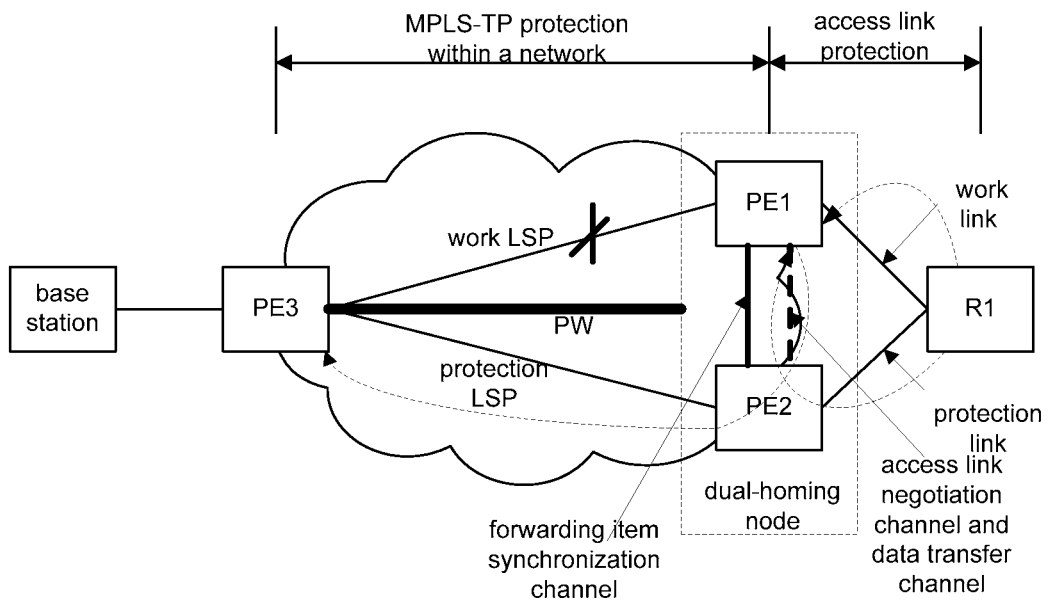
FIG. 6 is a diagram of an illustrative packet forwarding path, when the work LSP is breakdown, according to an example of the present disclosure.
Figure 7:
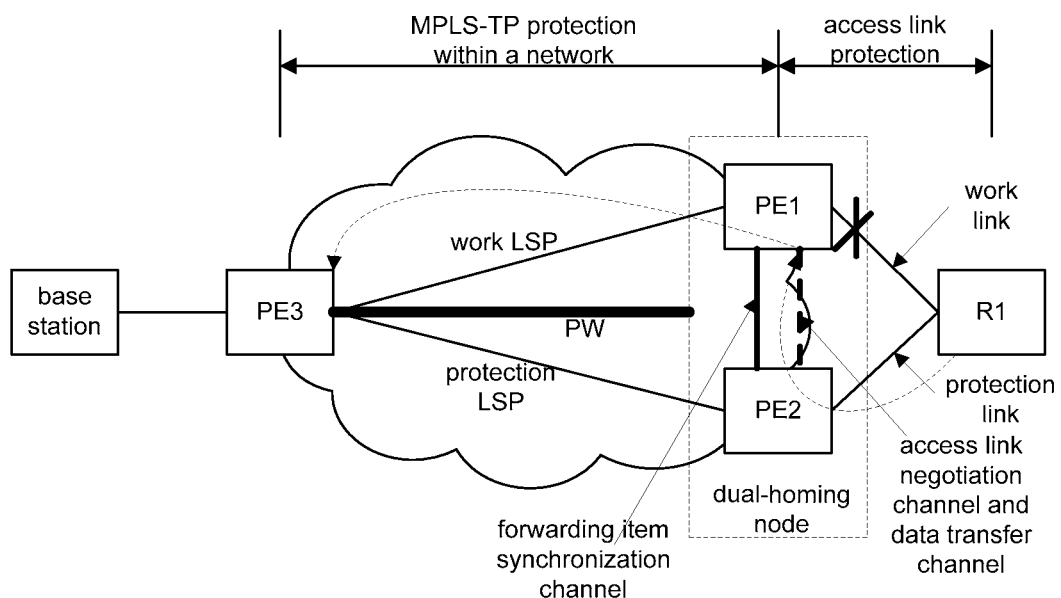
FIG. 7 is a diagram of an illustrative packet forwarding path, when the work link is breakdown, according to an example of the present disclosure.

Descriptions regarding the example shown in FIG. 4 are provided with respect to FIG. 5, FIG. 6, FIG. 7 and another example, in which the access link protection configured for the access link of the dual-homing node is the LMSP 1+1 protection.

FIG. 5 is a diagram of an illustrative packet forwarding path, when the work LSP and the work link are normal, according to an example of the present disclosure. As shown in FIG. 5 and based on FIG. 1, a forwarding item synchronization channel, a data transfer channel and an access link negotiation channel are established between PE1 and PE2. PE1 and PE2, which are taken as a logical device, may establish a PW and an LSP protection group bearing the PW with PE3. The LMSP 1+1 protection is configured for the access link. It should be noted that, the access link negotiation channel and the data transfer channel may share a channel.

When the work LSP, the protection LSP, the work link and protection link, which are both at the access connection side, are normal, R1 may simultaneously send a packet to the dual-homing node via the work link and the protection link. After receiving the packet sent by R1 via the protection link, PE2 may send the packet to PE1 via the data transfer channel between PE1 and PE2 (here and in subsequent FIG. 6, FIG. 7, an example is provided in which packets are aggregated to the PE connecting with the work link). At the same time, PE1 may receive the packet sent by R1 via the work link. Since the work link is normal, PE1 selects to receive the packet via the work link, and sends the packet via the work LSP (before sending the packet, PE1 is to encapsulate the packet, which is not repeated here). The packet forwarding path between R1 and PE3 are the dotted lines, R1->PE2->PE1, R1->PE1 and PE1->PE3 as shown in FIG. 5.

FIG. 6 is a diagram of an illustrative packet forwarding path, when the work LSP is broken down, according to an example of the present disclosure. As shown in FIG. 6 and based on FIG. 5, when the work LSP is broken down, while the work link and protection link, which are both at the access connection side, as well as the protection LSP, are normal, R1 may simultaneously send packets to the dual-homing node via the work link and the protection link. After receiving the packet sent by R1 via the protection link, PE2 may send the packet to PE1 via the data transfer channel between PE1 and PE2. PE1 may simultaneously receive the packet sent by R1 via the work link. Since the work link is normal, PE1 selects to receive the packet via the work link, encapsulates the packet (here and similarly in FIG. 7, first encapsulate the packet and then forward the packet locally according to the out port of the packet, or send the packet to the other PE device via the data transfer channel to be forwarded), and then determines that the out port of the packet is the out port of PE2 on the protection LSP. Thus, the encapsulated packet is sent to PE2 via the data transfer channel. And then, PE2 may forward the encapsulated packet via the protection LSP. The packet forwarding path from R1 to PE3 are the dotted lines, R1->PE2->PE1, R1->PE1 and PE1->PE2->PE3 as shown in FIG. 6.

FIG. 7 is a diagram of an illustrative packet forwarding path, when the work link is broken down, according to an example of the present disclosure. As shown in FIG. 7 and based on FIG. 5, when the work link is broken down, while the work LSP, the protection LSP, as well as the protection link at the access connection side are normal, R1 may send the packet to the dual-homing node via the protection link. After receiving the packet sent by R1 via the protection link, PE2 may send the packet to PE1 via the data transfer channel between PE1 and PE2. After receiving the packet from the protection link, which is sent by PE2 via the data transfer channel, PE1 may encapsulate the packet, and determine the out port of the packet is the out port of PE1 on the work LSP. Thus, PE1 may forward the encapsulated packet via the work LSP. The packet forwarding path from R1 to PE3 are the dotted lines R1->PE2->PE1 and PE1->PE3 as shown in FIG. 7.

In addition, it should be noted that, in FIG. 5, FIG. 6 and FIG. 7, descriptions about the packet forwarding path from R1 to PE3 are respectively provided for the following scenes. The work LSP and the work link are normal. The work LSP is broken down. The work link is broken down. Actually, in FIG. 5, FIG. 6 and FIG. 7, a primary device and a standby device is to be selected from PE1 and PE2. When the work LSP is broken down or the work LSP recovers, the primary device also is to modify the forwarding item associated with the LSP protection group, and is to synchronize with the standby device about the forwarding item associated with the LSP protection group via the forwarding item synchronization channel. Detailed descriptions about the specific process have already been provided for the example illustrated in FIG. 4, which are not repeated here.

In the foregoing, detailed descriptions about a method in the example of the present disclosure are provided. The present disclosure provides a dual-homing protection device, which may be applied to either PE device in the two PE devices included in the dual-homing node. A cross-device access link negotiation channel is established between the two PE devices. A cross-device access link protection is also configured for the access link of the dual-homing node. Detailed descriptions are provided in the following discussion with respect to FIG. 8.

Figure 8:
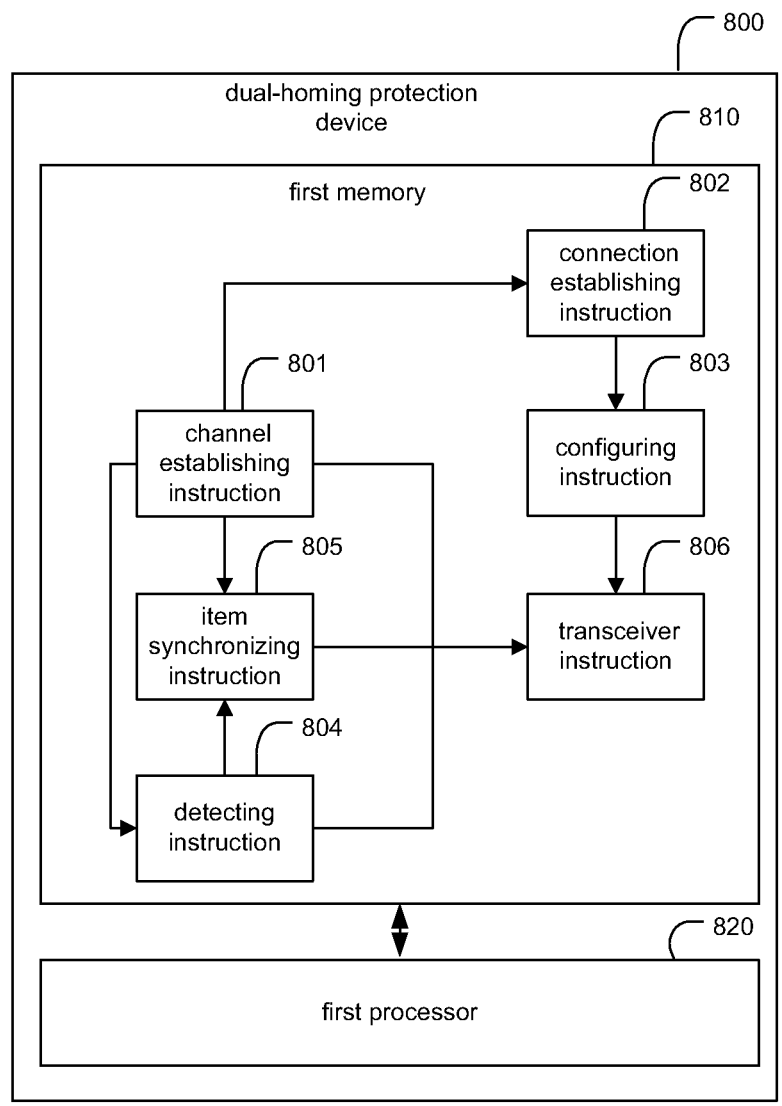
FIG. 8 is a diagram of an illustrative structure of a dual-homing protection device, according to an example of the present disclosure.

With reference to FIG. 8, FIG. 8 is a diagram of an illustrative structure of a dual-homing protection device, according to an example of the present disclosure. The device includes a first memory 810 and a first processor 820 in communication with the first memory 810. The first memory 810 may store a first group of operation instructions executable by the first processor 820. The first group of operation instructions may further include a channel establishing instruction 801, a connection establishing instruction 802, and a configuring instruction 803.

The channel establishing instruction 801 is to cause a data transfer channel and a forwarding item synchronization channel between the current PE device and the other PE device in the dual-homing node to be established, so as to enable the current PE device, located by the first memory 810, and the other PE device to be taken as a logical device on a control plane.

The connection establishing instruction 802 is to cause a PW and an LSP protection group bearing the PW to be established between a network side peer PE device and the logical device formed by the other PE device and the current PE device, in which the current PE device is located by the first memory 810.

The configuring instruction 803 is to cause a corresponding AC for the PW to be configured, in which the AC is born on the access link.

The current PE device may establish a work LSP bearing the PW with the peer PE device, according to the connection establishing instruction 802. The other PE device may establish a protection LSP bearing the PW with the peer PE device.

Alternatively, the current PE device may establish a protection LSP bearing the PW with the peer PE device, according to the connection establishing instruction 802. The other PE device may establish a work LSP bearing the PW with the peer PE device.

The work LSP and the protection LSP may form the LSP protection group.

The first memory 810 may further store a second group of operation instructions executable by the first processor 820. The second group of operation instructions may include a detecting instruction 804, an item synchronizing instruction 805, and a transceiver instruction 806.

The detecting instruction 804 is to indicate that a respective state of the work LSP and the protection LSP are to be detected, and indicate to negotiate with the other PE device about state of access link bearing the AC, via the access link negotiation channel.

The item synchronizing instruction 805 is to cause the local forwarding item associated with the LSP protection group to be associated with the work LSP, and to synchronize with the standby device about the forwarding item associated with the LSP protection group, via the forwarding item synchronization channel, when the PE device located by the first memory 810 is taken as the primary device and the work LSP is normal. When the work LSP is detected to be broken down, according to the detecting instruction 804, the item synchronizing instruction 805 is to cause modification of the local forwarding item associated with the LSP protection group to be associated with the protection LSP, and synchronize with the standby device about the modified forwarding item associated with the LSP protection group, via the forwarding item synchronization channel. If the PE device located by the first memory 810 is taken as the standby device, when the forwarding item associated with the LSP protection group synchronized by the primary device is received, the item synchronizing instruction 805 is to cause the local forwarding item associated with the LSP protection group to be covered with the forwarding item associated with the LSP protection group synchronized by the primary device.

The transceiver instruction 806 is to cause determination of the PW corresponding to the AC and the LSP protection group bearing the PW, when receiving a packet from the AC, forward a packet according to the PW corresponding to the AC and the forwarding item associated with the LSP protection group bearing the PW. When receiving a packet from the PW, the transceiver instruction 806 is cause the AC corresponding to the PW to be determined, and to cause the packet to be forwarded according to the configured cross-device access link protection, and state of the access link bearing the AC which is negotiated with the other PE device, according to the detecting instruction 804.

When the PE device located by the first memory 810 is taken as the primary device, and when detecting that the work LSP recovers according to the detecting instruction 804, the item synchronizing instruction 805 is further to cause the local forwarding item associated with the LSP protection group to be modified to be associated with the work LSP in the LSP protection group, and to synchronize with the standby device about the modified forwarding item associated with the LSP protection group, via the forwarding item synchronization channel.

When causing the local forwarding item associated with the LSP protection group to be associated with the work LSP in the LSP protection group, the item synchronizing instruction 805 is to cause the out label in the forwarding item to be the out label of the dual-homing node on the work LSP and the out port in the forwarding item to be the out port of the dual-homing node on the work LSP.

When causing the local forwarding item associated with the LSP protection group to be modified to be associated with the protection LSP in the LSP protection group, the item synchronizing instruction 805 is to cause the out label in the forwarding item to be modified to be the out label of the dual-homing node on the protection LSP, and the out port in the forwarding item to be modified to be the out port of the dual-homing node on the protection LSP.

When causing the local forwarding item associated with the LSP protection group to be modified to be associated with the work LSP in the LSP protection group, the item synchronizing instruction 805 is to cause the out label in the forwarding item to be modified to be the out label of the dual-homing node on the work LSP, and the out port in the forwarding item to be modified to be the out port of the dual-homing node on the work LSP.

When causing the packet to be forwarded according to the PW corresponding to the AC and the forwarding item associated with the LSP protection group bearing the PW, the transceiver instruction 806 is to respectively cause the out label of the PW corresponding to the AC and the out label in the forwarding item associated with the LSP protection group bearing the PW, to be taken as an inner label and an outer label of the packet, encapsulate the inner label and the outer label of the packet into the packet, and determine the out port of the packet according to the forwarding item associated with the LSP protection group bearing the PW. When the out port of the packet is a local port, the transceiver instruction 806 is to cause the packet to be sent out via the out port. When the out port of the packet is a port of the other PE device, the transceiver instruction 806 is to cause the packet and the out port information of the packet to be sent to the other PE device via the data transfer channel, to enable the other PE device to send out the packet via the out port of the other PE device.

The transceiver instruction 806 is further to cause the packet to be sent out via the out port according to the out port information of the packet, when receiving the packet and the out port information of the packet sent by the other PE device via the data transfer channel.

When causing the packet to be forwarded according to the PW corresponding to the AC and the forwarding item associated with the LSP protection group bearing the PW, the transceiver instruction 806 is to cause determination of the out port of the packet according to the forwarding item associated with the LSP protection group bearing the PW. When the out port of the packet is a local port, the transceiver instruction 806 is to respectively cause the out label of the PW corresponding to the AC and the out label in the forwarding item associated with the LSP protection group bearing the PW, to be taken as an inner label and an outer label of the packet, encapsulate the inner label and outer label of the packet into the packet, and send out the packet via the out port. When the out port of the packet is a port of the other PE device, the transceiver instruction 806 is to cause the packet and AC information to be sent to the other PE device via the data transfer channel, to enable the other PE device to send out the packet via the out port of the other PE device.

The transceiver instruction 806 is further to cause, when receiving the packet and the AC information sent by the other PE device via the data transfer channel, the PW corresponding to the AC and the LSP protection group bearing the PW to be determined, respectively take the out label of the PW corresponding to the AC and the out label in the forwarding item associated with the LSP protection group bearing the PW as an inner label and an outer label of the packet, encapsulate the inner label and outer label of the packet into the packet, determine the out port of the packet according to the forwarding item associated with the LSP protection group bearing the PW, and send out the packet via the out port.

When the access link is an SDH link and the cross-device access link protection configured for the access link is the LMSP 1+1 protection, the transceiver instruction 806 is to cause, after receiving the packet from the AC, and before determining the PW corresponding to the AC and the LSP protection group bearing the PW, when the access link of the PE device, located by the first memory 810, is the protection link, the packet to be sent to the other PE device via the data transfer channel; otherwise, the PW corresponding to the AC and the LSP protection group bearing the PW is to be determined.

When the access link of the PE device located by the first memory 810 is the work link, and the work link is normal, the transceiver instruction 806 is further to cause the packet to be selected to be received from the work link. When the work link is broken down, the transceiver instruction 806 further is to cause the packet to be selected to be received from the protection link, which is sent by the other PE device via the data transfer channel. When the access link of the PE device located by the first memory 810 is the protection link, and the work link is normal, the transceiver instruction 806 is to cause the packet to be selected to be received from the work link, which is sent by the other PE device via the data transfer channel. When the work link is broken down, the transceiver instruction 806 causes the packet to be selected to be received from the protection link.

Alternatively, after receiving the packet from the AC, and before determining the PW corresponding to the AC and the LSP protection group bearing the PW, the transceiver instruction 806 further causes, when the PE device located by the first memory 810 is the standby device, the packet to be sent to the other PE device via the data transfer channel; otherwise, the PW corresponding to the AC and the LSP protection group bearing the PW is determined.

When the PE device located by the first memory 810 is taken as the primary device, the access link of the PE device is the work link, which is normal, the transceiver instruction 806 further causes the packet to be selected to be received from the work link. When the access link of the PE device is the work link, which is broken down, the transceiver instruction 806 further causes the packet to be selected to be received from the protection link, which is sent by the other PE device via the data transfer channel. When the access link of the PE device is the protection link, and the work link is normal, the transceiver instruction 806 causes the packet to be selected to be received from the work link, which is sent by the other PE device via the data transfer channel. When the access link of the PE device is the protection link, and the work link is broken down, the transceiver instruction 806 further causes the packet to be selected to be received from the protection link.

According to the detecting instruction 804, when forwarding the PW packet according to the configured cross-device access link protection and state of the access link bearing the AC, which is negotiated with the other PE device via the access link negotiation channel, the transceiver instruction 806 is to cause the packet to be forwarded via the access link of the PE device, which is located by the first memory 810, and send the packet to the other PE device via the data transfer channel, to enable the other PE device to forward the packet via the access link of the other PE device.

The transceiver instruction 806 further causes, when receiving the PW packet sent by the other PE device via the data transfer channel, the packet to be forwarded via the access link of the PE device, which is located by the first memory 810.

Under the circumstances that the access link is an Ethernet link, the cross-device access link protection configured for the access link is the LAG load sharing protection, when forwarding the PW packet, according to the configured cross-device access link protection and state of the access link bearing the AC, which is negotiated with the other PE device via the access link negotiation channel, based on the detecting instruction 804, the transceiver instruction 806 causes, when respective the access links of the PE device located by the first memory 810 and the other PE device are normal, determine an access link for sending the packet according to a load sharing method. When the determined access link is the access link of the PE device located by the first memory 810, the transceiver instruction 806 causes the packet to be forwarded via the access link of the PE device located by the first memory 810. When the determined access link is the access link of the other PE device, the transceiver instruction 806 further causes the packet to be sent to the other PE device via the data transfer channel, to enable the other PE device to forward the packet via the access link of the other PE device.

The transceiver instruction 806 further causes, when receiving the PW packet sent by the other PE device via the data transfer channel, the packet to be forwarded via the access link of the PE device located by the first memory 810.

Under the circumstances that the access link is an SDH link, the cross-device access link protection configured for the access link is the LMSP 1:1 protection; or the access link is an Ethernet link, the cross-device access link protection configured for the access link is the LAG primary-standby protection, when forwarding the PW packet according to the configured cross-device access link protection and state of the access link bearing the AC, which is negotiated with the other PE device via the access link negotiation channel, based on the detecting instruction 804, the transceiver instruction 806 further causes, when the access link of the PE device located by the first memory 810 is the work link, which is normal, the packet to be forwarded via the work link. When the work link is broken down, the transceiver instruction 806 further causes the packet to be sent to the other PE device via the data transfer channel to enable the other PE device to forward the packet via the protection link. When the access link of the PE device located by the first memory 810 is the protection link, and the work link is normal, the transceiver instruction 806 further causes the packet to be sent to the other PE device via the data transfer channel to enable the other PE device to forward the packet via the work link. When the work link is broken down, the transceiver instruction 806 further causes the packet to be forwarded via the protection link.

The transceiver instruction 806 further causes, when receiving the PW packet sent by the other PE device via the data transfer channel, the packet to be forwarded via the access link of the PE device located by the first memory 810.

In practical applications, when applying the above-examples of the present disclosure to implement dual-homing protection method and device, the dual-homing protection method and device are to be finally implemented based on hardware architecture possessed by the PE device, which may be used in the above processes.

Figure 9:
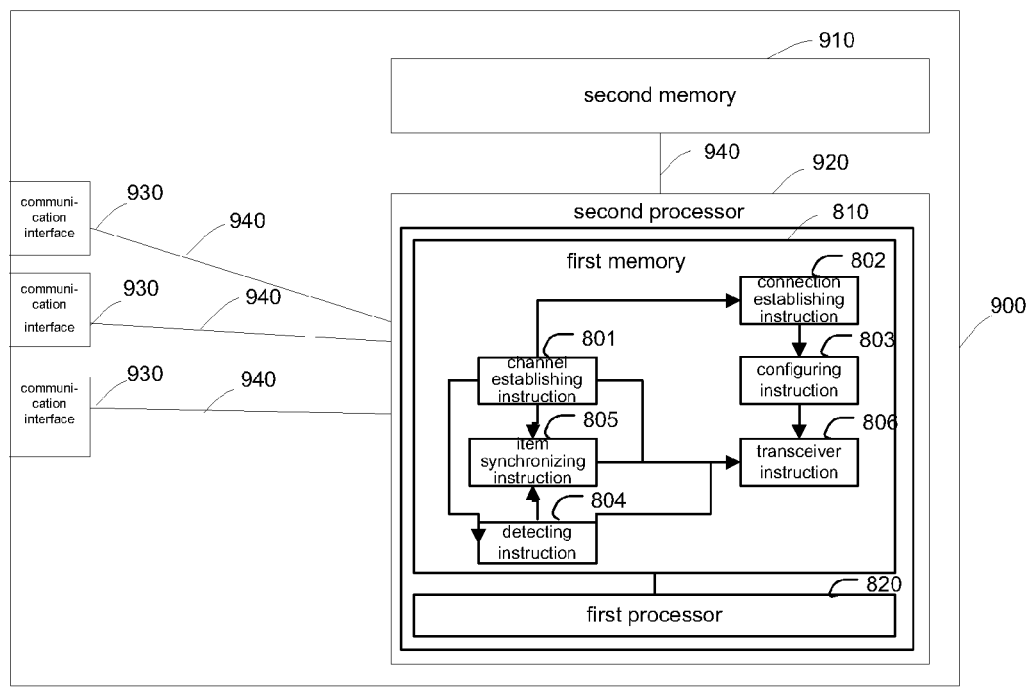
FIG. 9 is a diagram of an illustrative hardware structure based, according to an example of the present disclosure.

FIG. 9 is a diagram of an illustrative hardware structure based, according to an example of the present disclosure. As shown in FIG. 9, the hardware architecture of the PE device, which is applied to implement the dual-homing protection method and device in above examples of the present disclosure, includes: a second memory 910, a second processor 920, a communication interface 930, and an interconnection structure 940, which couples the second memory 910, the second processor 920 and the communication interface 930.

The first memory 910 is to store a forwarding item associated with an LSP protection group bearing a PW, and forwarding items relevant to the PW.

The second processor 920 includes the first memory 810 and the second processor 820 as shown in FIG. 8, and the instructions discussed above as stored in the first memory 810.

The channel establishing instruction 810 causes establishment of a data transfer channel and a forwarding item synchronizing channel with the other PE device in the dual-homing node, via the communication interface 930 to enable the PE device located by the second processor 920 and the other PE device to be taken as a logical device on the control plane.

The connection establishing instruction 802 causes establishment of a PW, as well as an LSP protection group bearing the PW, between the logical device and a network side peer PE device via the communication interface 930, in which the logical device is formed by the PE device located by the second processor 920 and the other PE device.

The configuring instruction 803 causes configuration of a corresponding AC for the PW, in which the AC is born on the access link.

In addition, the first memory 810 located within the second processor 920 may further store a detecting instruction 804, an item synchronizing instruction 805, a transceiver instruction 806.

The detecting instruction 804 causes detection of respective states of the work LSP and protection LSP in the LSP protection group, to negotiate the state of the access link, etc.

The item synchronizing instruction 805 causes modification and synchronization of the forwarding item associated with the LSP protection group according to detection result obtained by executing the detecting instruction 804.

The transceiver instruction 806 causes packets received from the network side and access link side to be forwarded.

Based on function division in the above hardware architecture, corresponding blocks to implement the dual-homing protection method in the above example of the present disclosure may be clear. Meanwhile, how to deploy corresponding components of the dual-homing protection device in above hardware architecture may also be clear.

Based on the above technical solution, it can be seen that in each example of the present disclosure, a forwarding item synchronizing channel and a data transfer channel are established between two PE devices in the dual-homing node, one of the two PE devices is selected to be taken as a primary device, and the remaining PE device may be taken as a standby device to enable the two PE devices to become a logical device on the control plane. The two PE devices, which are taken as a logical device, may establish a PW and an LSP protection group bearing the PW, with the network side peer PE device, so as to implement the LSP protection within a network. Existing access link protection may still be employed by the access link. Subsequently, a packet may be forwarded according to the LSP protection within a network and access link protection at the access link side. Thus, the protection within a network may be independent of the access link protection, and the management may be simple.

Some or all of the operations set forth in the methods disclosed herein may be contained as utilities, programs, or subprograms, in any desired computer accessible medium. In addition, the methods may be embodied by computer programs, which can exist in a variety of forms both active and inactive. For example, they may exist as software program(s) comprised of program instructions in source code, object code, executable code or other formats. Any of the above may be embodied on a computer readable storage medium.

Example computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A dual-homing protection method, which is applied to either Provider Edge (PE) device in two PE devices of a dual-homing node, wherein a cross-device access link negotiation channel is established between the two PE devices, and a cross-device access link protection is configured for an access link of the dual-homing node, comprising:

establishing, by a current PE device, a data transfer channel and a forwarding item synchronization channel with the other PE device in the dual-homing node to enable the current PE device and the other PE device to be taken as a logical device on a control plane;

establishing, by the current PE device and the other PE device, which are taken as the logical device, a Pseudo Wire (PW) and a Label Switched Path (LSP) protection group bearing the PW, with a network side peer PE device;

configuring an Access Circuit (AC) for the PW, wherein the AC is born on the access link;

wherein the current PE device establishes a work LSP bearing the PW with the network side peer PE device and the other PE device establishes a protection LSP bearing the PW with the network side peer PE device; or the current PE device establishes the protection LSP bearing the PW with the network side peer PE device and the other PE device establishes the work LSP bearing the PW with the network side peer PE device;

wherein the work LSP and the protection LSP form the LSP protection group; and when the work LSP is detected as being broken down, modifying the local forwarding item associated with the LSP protection group to be associated with the protection LSP and synchronizing with a standby device about the modified forwarding item associated with the LSP protection group via the forwarding item synchronization channel.

2. The method according to claim 1, further comprising:

when the current PE device is taken as a primary device and the work LSP is normal, configuring a local forwarding item associated with the LSP protection group to be associated with the work LSP and synchronizing with the standby device about the forwarding item associated with the LSP protection group via the forwarding item synchronization channel;

when the current PE device is taken as the standby device, after receiving the forwarding item associated with the LSP protection group synchronized by the primary device, covering, by the current PE device, the local forwarding item associated with the LSP protection group with the forwarding item associated with the LSP protection group synchronized by the primary device;

when receiving a packet from the AC, determining, by the current PE device, the PW corresponding to the AC and the LSP protection group bearing the PW, and forwarding the packet according to the PW corresponding to the AC and the forwarding item associated with the LSP protection group bearing the PW; and when receiving a packet from the PW, determining, by the current PE device, the AC corresponding to the PW, and forwarding the packet according to a configured cross-device access link protection and state of the access link bearing the AC, which is negotiated with the other PE device via the access link negotiation channel.

3. The method according to claim 2, further comprising:

when the current PE device is taken as the primary device and detecting that the work LSP recovers, modifying the local forwarding item associated with the LSP protection group to be associated with the work LSP and synchronizing with the standby device about the modified forwarding item associated with the LSP protection group via the forwarding item synchronization channel.

4. The method according to claim 3, wherein configuring the local forwarding item associated with the LSP protection group to be associated with the work LSP comprises:

configuring an out label in the forwarding item to be an out label of the dual-homing node on the work LSP and configuring an out port in the forwarding item to be an out port of the dual-homing node on the work LSP;

wherein modifying the local forwarding item associated with the LSP protection group to be associated with the protection LSP comprises:

modifying the out label in the forwarding item to be the out label of the dual-homing node on the protection LSP and modifying the out port in the forwarding item to be the out port of the dual-homing node on the protection LSP; and wherein modifying the local forwarding item associated with the LSP protection group to be associated with the work LSP comprises:

modifying the out label in the forwarding item to be the out label of the dual-homing node on the work LSP and modifying the out port in the forwarding item to be the out port of the dual-homing node on the work LSP.

5. The method according to claim 4, wherein forwarding the packet according to the PW corresponding to the AC and the forwarding item associated with the LSP protection group bearing the PW comprises:

respectively taking an out label of the PW corresponding to the AC and the out label in the forwarding item associated with the LSP protection group bearing the PW as an inner label and an outer label of the packet, encapsulating the inner label and outer label of the packet into the packet, and determining an out port of the packet according to the forwarding item associated with the LSP protection group bearing the PW;

when the out port of the packet is a local port, sending the packet via the out port;

when the out port of the packet is a port of the other PE device, sending the packet and out port information of the packet to the other PE device via the data transfer channel to enable the other PE device to send the packet via the out port of the other PE device; and wherein the method further comprises:

when receiving the packet and the out port information of the packet sent by the other PE device via the data transfer channel, sending the packet via the out port according to the out port information of the packet.

6. A dual-homing protection device, which is applied to either Provider Edge (PE) device of two PE devices in a dual-homing node, wherein a cross-device access link negotiation channel is established between the two PE devices, a cross-device access link protection is configured for an access link of the dual-homing node, the device comprising:

a first memory and a first processor, wherein the first processor is to communicate with the first memory and execute instructions stored in the first memory, the first memory is to store a channel establishing instruction, a connection establishing instruction and a configuring instruction;

the channel establishing instruction is to cause establishment of a data transfer channel and a forwarding item synchronization channel between a current PE device located by the first memory and the other PE device in the dual-homing node to enable the current PE device located by the first memory and the other PE device to be taken as a logical device on a control plane;

the connection establishing instruction is to cause establishment of a Pseudo Wire (PW) and a Label Switched Path (LSP) protection group bearing the PW between the logical device and a network side peer PE device, wherein the logical device is formed by the current PE device located by the first memory and the other PE device;

the configuring instruction is to cause configuration of a corresponding Access Circuit (AC) for the PW, wherein the AC is born on the access link, and wherein the current PE device located by the first memory establishes a work LSP bearing the PW with the network side peer PE device according to the connection establishing instruction and the other PE device establishes a protection LSP bearing the PW with the network side peer PE device according to the connection establishing instruction; or, the current PE device located by the first memory establishes the protection LSP bearing the PW with the network side peer PE device according to the connection establishing instruction and the other PE device establishes the work LSP bearing the PW with the network side peer PE device according to the connection establishing instruction;

wherein the work LSP and the protection LSP form the LSP protection group; and when the work LSP is detected as being broken down according to the detecting instruction, the item synchronizing instruction is to cause modification of the local forwarding item associated with the LSP protection group to be associated with the protection LSP and synchronization with a standby device about the modified forwarding item associated with the LSP protection group.

7. The device according to claim 6, wherein the first memory is further to store a detecting instruction, an item synchronizing instruction, and a transceiver instruction, the detecting instruction is to cause detection of respective states of the work LSP and the protection LSP and cause negotiation with the other PE device about the state of the access link bearing the AC via the access link negotiation channel;

when the current PE device located by the first memory is taken as a primary device and the work LSP is normal, the item synchronizing instruction is to cause configuration of a local forwarding item associated with the LSP protection group to be associated with the work LSP and synchronization with the standby device about the forwarding item associated with the LSP protection group via the forwarding item synchronization channel;

when the PE device located by the first memory is taken as the standby device, after receiving the forwarding item associated with the LSP protection group, which is synchronized by the primary device, the item synchronizing instruction is to cause coverage of the local forwarding item associated with the LSP protection group with the forwarding item associated with the LSP protection, which is synchronized by the primary device; and when receiving a packet from the AC, the transceiver instruction is to cause determination of the PW corresponding to the AC and the LSP protection group bearing the PW, the packet to be forwarded according to the PW corresponding to the AC and the forwarding item associated with the LSP protection group bearing the PW;

when receiving a packet from the PW, the transceiver instruction is to cause determination of the AC corresponding to the PW, the packet to be forwarded according to a configured cross-device access link protection and state of the access link bearing the AC, which is negotiated with the other PE device according to the detecting instruction.

8. The device according to claim 7, wherein when the current PE device located by the first memory is taken as the primary device and detecting the work LSP recovers according to the detecting instruction, the item synchronizing instruction is further to cause modification of the local forwarding item associated with the LSP protection group to be associated with the work LSP in the LSP protection group, and synchronization with the standby device about the modified forwarding item associated with the LSP protection group, via the forwarding item synchronization channel.

9. The device according to claim 8, wherein when causing configuration of the local forwarding item associated with the LSP protection group to be associated with the work LSP in the LSP protection group, the item synchronizing instruction is to cause configuration of an out label in the forwarding item to be an out label of the dual-homing node on the work LSP and configuration of an out port in the forwarding item to be an out port of the dual-homing node on the work LSP;

when causing modification of the local forwarding item associated with the LSP protection group to be associated with the protection LSP in the LSP protection group, the item synchronizing instruction is to cause modification of the out label in the forwarding item to be the out label of the dual-homing node on the protection LSP and modification of the out port in the forwarding item to be the out port of the dual-homing node on the protection LSP; and when causing modification of the local forwarding item associated with the LSP protection group to be associated with the work LSP in the LSP protection group, the item synchronizing instruction is to cause modification of the out label in the forwarding item to be the out label of the dual-homing node on the work LSP, and modification of the out port in the forwarding item to be the out port of the dual-homing node on the work LSP.

10. The device according to claim 9, wherein when causing the packet to be forwarded according to the PW corresponding to the AC and the forwarding item associated with the LSP protection group bearing the PW, the transceiver instruction is to respectively cause an out label of the PW corresponding to the AC and the out label in the forwarding item associated with the LSP protection group bearing the PW to be taken as an inner label and an outer label of the packet, encapsulate the inner label and the outer label of the packet into the packet, and determine an out port of the packet according to the forwarding item associated with the LSP protection group bearing the PW;

when the out port of the packet is a local port, cause the packet to be sent via the out port;

when the out port of the packet is a port of the other PE device, cause the packet and out port information of the packet to be sent to the other PE device via the data transfer channel to enable the other PE device to send the packet via the out port of the other PE device;

when receiving the packet and the out port information of the packet sent by the other PE device via the data transfer channel, the transceiver instruction is further to cause the packet to be sent via the out port according to the out port information of the packet.

11. The device according to claim 9, wherein when causing the packet to be forwarded according to the PW corresponding to the AC and the forwarding item associated with the LSP protection group bearing the PW, the transceiver instruction is to cause determination of the out port of the packet according to the forwarding item associated with the LSP protection group bearing the PW;

when the out port of the packet is a local port, respectively cause the out label of the PW corresponding to the AC and the out label in the forwarding item associated with the LSP protection group bearing the PW to be taken as an inner label and an outer label of the packet, encapsulate the inner label and the outer label of the packet into the packet, and send the packet via the out port;

when the out port of the packet is a port of the other PE device, cause the packet and AC information to the other PE device to be sent via the data transfer channel to enable the other PE device to send the packet via the out port of the other PE device; and when receiving the packet and the AC information sent by the other PE device via the data transfer channel, the transceiver instruction is further to cause determination of the PW corresponding to the AC and the LSP protection group bearing the PW, respectively cause the out label of the PW corresponding to the AC and the out label in the forwarding item associated with the LSP protection group bearing the PW to be taken as an inner label and an outer label of the packet, encapsulate the inner label and outer label of the packet into the packet, determine the out port of the packet according to the forwarding item associated with the LSP protection group bearing the PW, and send the packet via the out port.

12. The device according to claim 7, wherein when the access link is a Synchronous Digital Hierarchy (SDH) link, the cross-device access link protection configured for the access link is a Linear Multiplex Section Protection(LMSP) 1+1 protection;

after receiving the packet from the AC and before determining the PW corresponding to the AC and the LSP protection group bearing the PW, the transceiver instruction is further to cause, when the access link of the current PE device located by the first memory is a protection link, the packet to be sent to the other PE device via the data transfer channel; otherwise, cause determination of the PW corresponding to the AC and the LSP protection group bearing the PW; and when the access link of the current PE device located by the first memory is a work link and the work link is normal, the transceiver instruction is to cause the packet to be selected to be received from the work link; when the work link is broken down, cause the packet to be selected to be received from the protection link, which is sent by the other PE device via the data transfer channel; when the access link of the current PE device located by the first memory is the protection link and the work link is normal, cause the packet to be selected to be received from the work link, which is sent by the other PE device via the data transfer channel; when the work link is breakdown, cause the packet to be selected to be received from the protection link; or after receiving the packet from the AC and before determining the PW corresponding to the AC and the LSP protection group bearing the PW, the transceiver instruction is further to cause, when the current PE device located by the first memory is taken as the standby device, the packet to be sent to the other PE device via the data transfer channel; otherwise, cause determination of the PW corresponding to the AC and the LSP protection group bearing the PW; and when the current PE device located by the first memory is taken as the primary device, the access link of the current PE device is the work link, and the work link is normal, the transceiver instruction causes the packet to be selected to be received from the work link; when the access link of the current PE device located by the first memory is the work link, and the work link is broken down, the transceiver instruction causes the packet to be selected to be received from the protection link, which is sent by the other PE device via the data transfer channel; when the access link of the current PE device located by the first memory is the protection link and the work link is normal, the transceiver instruction causes the packet to be selected to be received from the work link, which is sent by the other PE device via the data transfer channel; when the access link of the current PE device located by the first memory is the protection link, and the work link is broken down, the transceiver instruction causes the packet to be selected to be received from the protection link.

13. The device according to claim 12, wherein when causing a PW packet to be forwarded according to the configured cross-device access link protection and the state of the access link bearing the AC, which is negotiated with the other PE device via the access link negotiation channel according to the detecting instruction, the transceiver instruction is to cause the packet to be forwarded via the access link of the current PE device located by the first memory, and to cause the packet to be sent to the other PE device via the data transfer channel to enable the other PE device to forward the packet via the access link of the other PE device; and when receiving the PW packet sent by the other PE device via the data transfer channel, the transceiver instruction is further to cause the packet to be forwarded via the access link of the current PE device located by the first memory.

14. The device according to claim 7, wherein when the access link is an Ethernet link, the cross-device access link protection configured for the access link is a Link Aggregation Group (LAG) load sharing protection, when forwarding a PW packet according to the configured cross-device access link protection and the state of the access link bearing the AC, which is negotiated with the other PE device via the access link negotiation channel according to the detecting instruction, the transceiver instruction is to cause, when respective access link of the current PE device located by the first memory and the other PE device is normal, determination of the access link for sending the packet according to a load sharing method;

when the access link determined is the access link of the current PE device located by the first memory, cause the packet to be forwarded via the access link of the current PE device located by the first memory;

when the access link determined is the access link of the other PE device, cause the packet to be sent to the other PE device via the data transfer channel to enable the other PE device to forward the packet via the access link of the other PE device; and when receiving the PW packet sent by the other PE device via the data transfer channel, the transceiver instruction is further to cause the packet to be forwarded via the access link of the current PE device located by the first memory.

15. The device according to claim 7, wherein when the access link is a Synchronous Digital Hierarchy (SDH) link, the cross-device access link protection configured for the access link is a Linear Multiplex Section Protection (LMSP) 1:1 protection;

or the access link is an Ethernet link, the cross-device access link protection configured for the access link is a Link Aggregation Group (LAG) primary-standby protection;

when forwarding a PW packet according to the configured cross-device access link protection and the state of the access link bearing the AC, which is negotiated with the other PE device via the access link negotiation channel according to the detecting instruction, the transceiver instruction is to cause, when the access link of the current PE device located by the first memory is a work link and the work link is normal, the packet to be forwarded via the work link;

when the work link is broken down, cause the packet to be sent to the other PE device via the data transfer channel to enable the other PE device to forward the packet via a protection link;

when the access link of the current PE device located by the first memory is the protection link and the work link is normal, cause the packet to be sent to the other PE device via the data transfer channel to enable the other PE device to forward the packet via the work link;

when the work link is broken down, cause the packet to be forwarded via the protection link; and when receiving the PW packet sent by the other PE device via the data transfer channel, the transceiver instruction is further to cause the packet to be forwarded via the access link of the current PE device located by the first memory.

* * * * *